United States Patent
Gerhard

[15] 3,671,068
[45] June 20, 1972

[54] SHOCK ABSORBING VEHICLE

[72] Inventor: Otto Gerhard, Wohrdstrasse 95, 84 Regensburg, Germany

[22] Filed: May 20, 1968

[21] Appl. No.: 730,496

[30] Foreign Application Priority Data

May 22, 1967 Germany.............................G 50150

[52] U.S. Cl..................................293/1, 180/82, 180/91, 188/1 C, 244/1, 244/138, 248/9, 293/30, 293/60, 293/70, 296/1
[51] Int. Cl..................B60r 19/00, B61g 11/16, F16d 63/00
[58] Field of Search..................180/82, 91, 92; 188/1 C, 94; 244/1, 138; 248/9; 293/1, 52 F, 60, 70, 73, 85, 86, 72, 30, 84; 296/31 P, 35, 65, 65.1, 1; 297/216

[56] References Cited

UNITED STATES PATENTS

| | | | |
|---|---|---|---|
| 1,637,152 | 7/1927 | Kehrer | 293/84 |
| 3,226,146 | 12/1965 | Behr | 293/30 |
| 2,508,836 | 5/1950 | Morris | 293/72 X |
| 2,557,105 | 6/1951 | Hight | 244/138 |
| 2,776,695 | 1/1957 | Wells | 188/1 X C |
| 1,766,925 | 6/1930 | Moorhouse | 248/9 |
| 1,799,065 | 3/1931 | Rohm | 293/86 |
| 2,457,103 | 12/1948 | Lacrotte | 244/1 |
| 2,517,860 | 8/1950 | Forgy | 180/91 X |
| 2,600,060 | 6/1952 | Lopes et al. | 293/85 |
| 2,628,118 | 2/1953 | Gunnels, Jr. | 293/73 |
| 2,811,385 | 10/1957 | Butler | 293/86 |
| 2,837,176 | 6/1958 | Dropkin | 188/1 C |
| 2,880,815 | 4/1959 | Apfelbaum | 180/82 |
| 2,896,735 | 7/1959 | Bohn | 180/92 |
| 2,900,036 | 8/1959 | Blake | 296/65 X |
| 2,997,325 | 8/1961 | Peterson | 293/1 |
| 3,059,966 | 10/1962 | Spielman | 297/216 |
| 3,097,725 | 7/1963 | Peterson | 188/94 |
| 3,162,479 | 12/1964 | Hewitt | 296/35 |
| 3,232,383 | 2/1966 | Moberg | 188/1 C |
| 3,268,256 | 8/1966 | Blank | 297/216 |
| 3,369,634 | 2/1968 | Sung | 296/35 |
| 3,367,709 | 2/1968 | Mazelsky | 188/1 C |

FOREIGN PATENTS OR APPLICATIONS

| | | |
|---|---|---|
| 267,209 | 3/1927 | Great Britain..........................293/30 |
| 412,897 | 5/1925 | Germany |
| 854,157 | 10/1952 | Germany |
| 904,503 | 2/1954 | Germany |
| 1,172,558 | 6/1964 | Germany |
| 1,208,208 | 12/1965 | Germany |
| 1,237,453 | 3/1967 | Germany |
| 1,743,253 | 4/1957 | Germany |

Primary Examiner—Arthur L. La Point
Assistant Examiner—Howard Beltran
Attorney—Sparrow and Sparrow

[57] ABSTRACT

A car or motor vehicle having an undivided chassis with deformation zones therein and having means which can be deformed and destroyed. A plurality of at least two-part kinetic energy dissipating devices, in which the parts are displaceable one against another, are attached with their ends to respective ends of the deformation zones for bridging the latter. The energy dissipating devices consist mainly of push rods coaxially arranged with corresponding housings containing breaker plates which are pierced by the rods.

4 Claims, 14 Drawing Figures

PATENTED JUN 20 1972 3,671,068

INVENTOR:

Otto Gerhard

By

Sparrow and Sparrow
Attorneys

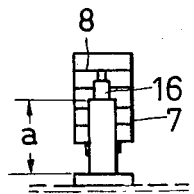
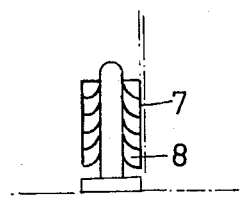
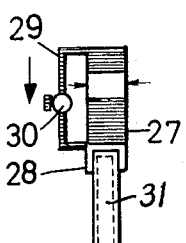
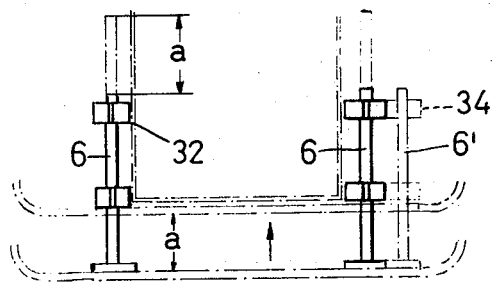
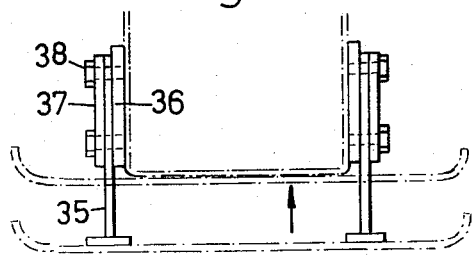
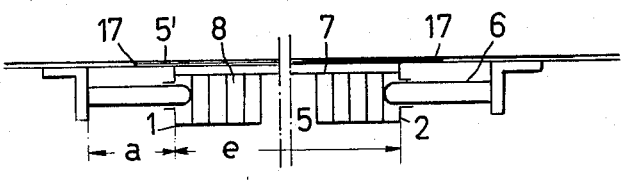
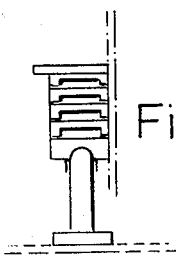

SHOCK ABSORBING VEHICLE

BACKGROUND OF THE INVENTION

The invention relates to devices for dissipation of kinetic energy of vehicles in case of collisions thereof.

Manufacturers have in recent years developed certain safety features which are intended to reduce the dangers incident to high speed impacts in order to protect the vehicle passengers. Automotive manufacturers have developed padded dashboards, padded sun-visors and seat belts which are fastened about the waist of the passengers and restrain forward movement of the passengers in the event of a front end collision. Airplanes have also long been provided with safety belts to restrain passenger movement in the event of a severe impact.

These safety features have had, however, only limited effectiveness. For example, in automotive application at reduced speeds, the safety features have provided the necessary factor to prevent serious or fatal injury to the automobile passengers. However, at high speed impacts, these safety devices have proved ineffective, and passengers involved in such accidents have suffered serious consequences. These undesirable results exist by virtue of the fact that in a high speed impact or collision, the vehicle is almost instantaneously decelerated to zero velocity with the kinetic energy of the vehicle being absorbed by deformation of the vehicle front end components causing the passengers to be thrown forward at a velocity approximating the vehicle speed prior to impact. The kinetic energy of the bodies of the passengers must be absorbed to decelerate them along with the vehicle after impact. At very high speeds even padded dashboards and safety belts are ineffective to decelerate the passengers at a reasonable rate and to absorb safely the shock of rapid deceleration.

SUMMARY OF THE INVENTION

In the present invention the described disadvantages are avoided by providing a motor vehicle with devices for the dissipation of kinetic impact energy, comprising undivided chassis deformation zones and at least two-part energy dissipating means, the parts of which are displaceable against one another, are attached for bridging the deformation zones endwise to the ends of the actual deformation zone. If a car is involved in an accident, push rods will enter a housing and pierce over a certain distance special plates which are rigidly assembled in the axial direction of the housing and in the direction of travelling. By these means kinetic energy can be dissipated to the highest degree within a very short time. Accordingly, it is a principal object of the present invention to provide an improved safety construction for vehicles, aircraft and other similar motor vehicles.

In a modification for dissipating of motion-energy fluid cylinders may be provided in which in axial direction a hollow piston is guided in a gland and in case of a crash enters into the cylinder, shifting forwards the liquid contained in the cylinder. At the forward end of the latter the liquid is returned into it since it has a somewhat larger diameter than the hollow piston, and during the movement the piston receives the receding liquid. Also at this embodiment energy is continuously dissipated to a desired degree. Furthermore push rods may be mounted between clamps rigidly attached to the chassis, and in case of a crash the rods under friction are pushed a certain distance into the clamps. The rods and clamps may be provided in multiple units. Using these means further protecting units may be constructed without affecting the outer appearance of the car.

The new arrangements and devices do not have to be very costly in view of their high economic value, are well adaptable for specific masses and velocities, that is, kinetic energies of various cars, can be prefabricated and are easily exchangeable.

Various further and more specific purposes, features and advantages will clearly appear from the detailed description given below taken in connection with the accompanying drawing which form part of this specification and illustrate merely by way of examples embodiments of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings, in which

FIG. 5a shows a device similar to FIG. 5 but with spacer rings bent up from the plates and with U-shaped section of the plates.

FIG. 7 shows a stepped push rod with various diameters for multiple penetration.

FIG. 8 shows a fully operated push rod after complete penetration of the plates.

FIG. 9 shows the arrangement of devices on a chassis of a car or on the walls thereof coacting with operable parts and reinforced protective cells.

FIG. 10 shows a push rod with a fluid cylinder.

FIG. 11 shows a plan view of an arrangement with devices on a bumper and with push rods clamped by brackets and acting in friction contact.

FIG. 12 shows a plan view with flat push rods clamped by bracket plates and screws in friction contact.

DESCRIPTION OF THE PREFERRED EMBODIMENTS

Figure 1:
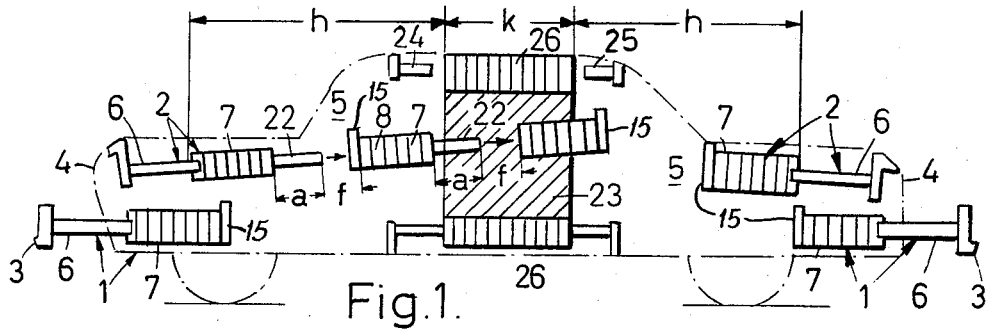
FIG. 1 shows the side-view of a passenger car with the non-returning devices arranged in the front and rear parts and the car structure.
Figure 2:
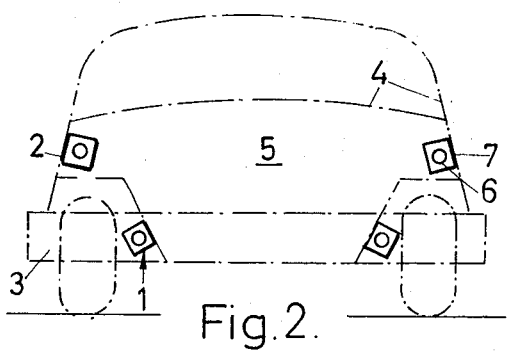
FIG. 2 shows the front of a car with non-returning devices on the bumpers and chassis.
Figure 3:
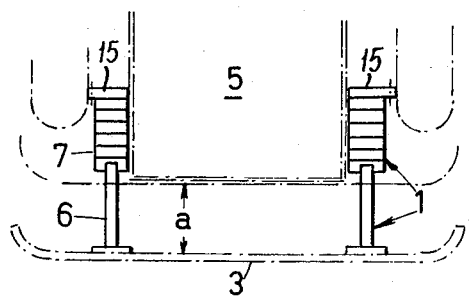
FIG. 3 shows the plan view to FIG. 2 and the connection of the dissipating devices at the front bumper of a car.
Figure 4:
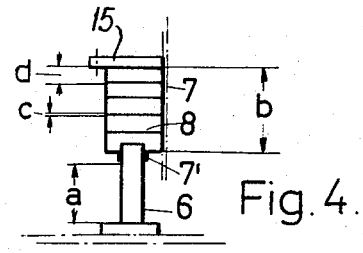
FIG. 4 shows the device at the front side with blunt push rods and spacer rings between plates.

According to the Figures one or more non-resilient energy-dissipating devices 1 and 2 are mounted on bumpers 3 or on car structures 4 preferably in the front or rear areas as well as on the top and on the underside of the car in such a manner that rigid protection enclosures 5 are formed (FIG. 1 and 2). The energy dissipating devices contain push rods 6 rigidly connected with the bumpers 3 or with exterior wall and frame structure 4 and disposed in horizontal or slightly tilted position in the direction of traveling before a counter part of a housing 7, separately positioned in the same axial direction as rods 6. Housings 7 have selective cross sections and lengths (FIG. 1–3). Push rod 6 itself is guided at the adjacent front side of the housing 7 at 7' (FIG. 4 and 5).

Figure 5:
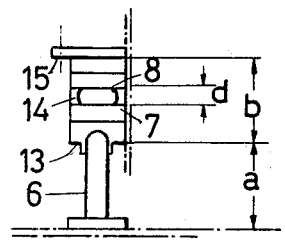
FIG. 5 shows a device with a push rod with rounded point and with spacer rings between plates.
Figure 6:
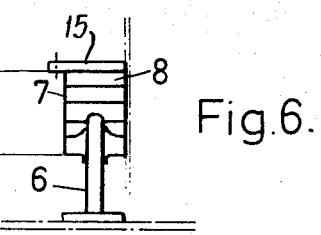
FIG. 6 shows a push rod in action at the start of penetration into the housing containing breaker plates.
Figure 13:
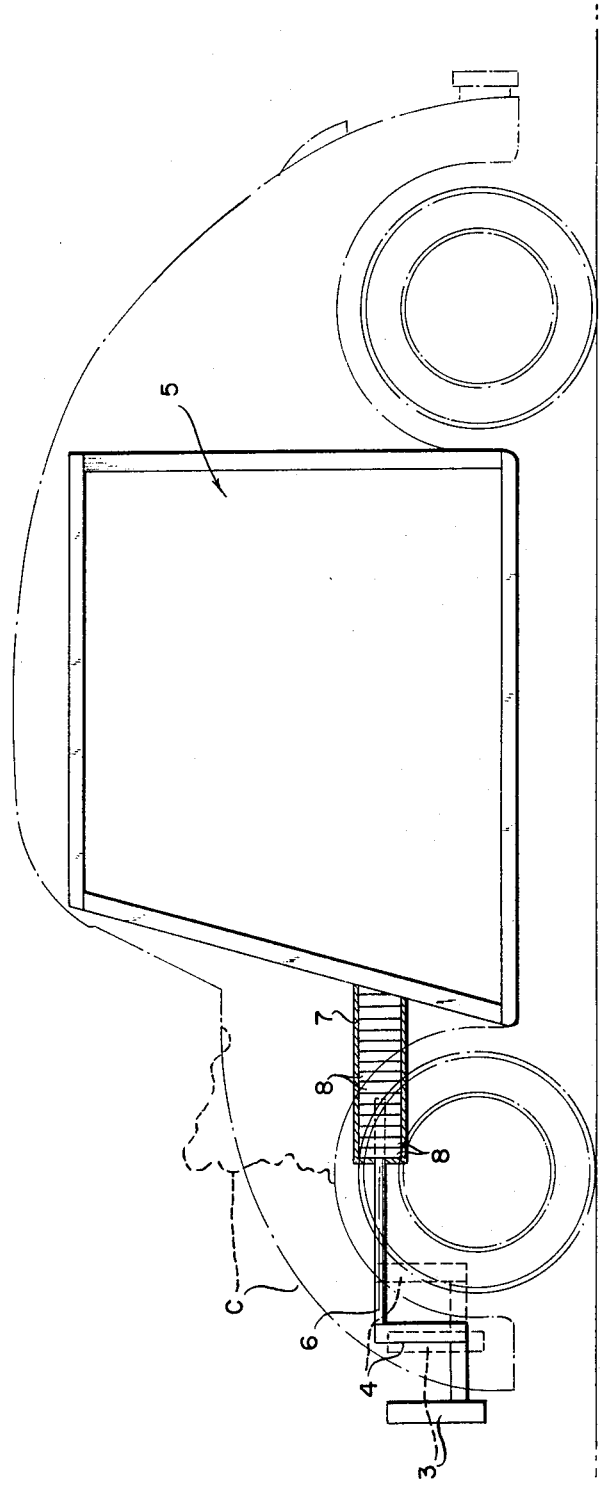
FIG. 13 is a side view schematic of a passenger car showing the basic concept of the invention.

In case of a shock on the car the push rod 6 is caused by the inertia of the mass of the car to enter into housing 7 (FIG. 5, 6 and 8). As shown in FIG. 13, the energy dissipating means in the form of the rod and plates spans a deformable compartment C, which itself absorbs some energy during impact by crumpling as shown in dotted lines.

Inside housing 7, plates or discs 8 are rigidly connected with the housing, arranged in the direction of the length of the housing, and serve as break plates and penetration elements. They are punctured by the push rod 6 along the stroke $a$ thereof and in this manner dissipate the kinetic energy. There is effected either a punching work by blunt push rods or by penetrating, stretching and friction work by push rods rounded at their point (FIG. 1 – 6 and 8). The design of push rods 6 and housings 7 with regard to penetration stroke $a$ and length $b$ of the housing is influenced in view of the energies to be received and dissipated so that it may be possible to prefabricate standardized structures for selected forces. Thereby the required thicknesses $c$ of the plates and their mutual distances $d$ result, which may vary in one case as well as the number of plates built into housing 7 over the length $b$ thereof (FIG. 4).

The plates 8 in housing 7 are arranged substantially at right angles to the longitudinal direction so that between the rear part 15 and bottom 13 a spacer ring 14 may be inserted, which is rigid at the push rod side of the housing and which is centrally guiding the push rod 6. Spacer ring 14 has a selected thickness $d$ and a plate 8, assembled together, and the housing 7 is closed at the rear end thereof by a cover 15 pressing together all plates and spacer rings (FIG. 5).

The distance between the plates may be secured by the upward bending of their outer edges at the circumference thereof, to the distance $d$ (FIG. 5a).

Push rods 16 with staggered diameters at their working end or gradually increasing from small to larger penetrating sections multiply the required penetrating force. The same plates 8 are therefore successively penetrated over the smallest distances by gradually increasing cross sections.

In this manner along the travel $a$, a continuous penetration work is attained and thereby more motion energy is dissipated than with push rods which do not have increasing diameters. (FIG. 7).

On the walls of the car, at the top and at the bottom, particularly at junction points between the exterior walls 4 forming the deformation zone and the reinforced walls of protection cells enclosure 5 (FIG. 9) dissipation devices are aligned at distances $e$ in series and are also acting against one another.

According to the invention a plurality of devices may be connected in series, which in rapid succession or in uninterrupted continuous change are operated, the effective travel $a$ being increased by additional travel $f$ (FIG. 1) in order to multiply the maximum travel and the dissipation of motion energy during the entire time of deceleration. The push rods 22 are arranged for this case at housing 7.

Interconnected deformation zones 23 (marked in the drawing by cross-hatching) in the car structure are provided together with similar devices acting one against another. Push rods 24 and 25 and double-ended housings 26 are attached at the reinforced enclosure 5 and at the weaker deformation zone 23, in order to dissipate the motion energy occuring in these areas and to protect and maintain the passenger protection enclosure 5 (FIG. 1).

A further modification is shown in FIG. 10 modifying the non-returning dissipation of motion energy by providing a fluid cylinder 27, in which the hollow piston 31, sealed in a bushing 28, is guided and at a crash enters the cylinder, pushing forward the fluid in the cylinder and at the front end recirculating it back into the cylinder 27 in the direction of the arrow.

For better effect the diameter of the cylinder $g$ is made somewhat larger than that of the hollow piston 31. In the return line 29 a valve 30 is disposed for the control of the fluid. The returning fluid is received by hollow piston 31 (FIG. 10).

A further modification of the devices based only on friction is shown by FIG. 11. In this case push rods 6, 6' are fastened between clamps 32 attached to the car and will dissipate the energy by friction along the travel $a$.

It is furthermore possible to provide a plurality of push rods 6, 6' fastened together by multiple-clamps 34 in order to multiply the friction force. A similar effect is obtained according to FIG. 12 by flat rodlike supports 35 guided within slots or notches and for the necessary friction engagement by means of plates 36 and counter plates 37 bolted together by screws 38. The friction engagement is adjustable by the screws 38.

While the invention has been described and illustrated with respect to certain preferred examples which give satisfactory results, it will be understood by those skilled in the art after understanding the principle of the invention, that various other changes and modifications may be made without departing from the spirit and scope of the invention, and it is intended therefor in the appended claims to cover all such changes and modifications.

I claim:

1. A vehicle protection arrangement comprising, in combination, a rigid reinforced enclosure, at least one rigid deformable kinetic energy absorbing compartment adjacent to and attached to said enclosure, and breakable energy dissipating means spanning said energy absorbing compartment and directly connected to said enclosure, said energy dissipating means comprising rod means movable toward said enclosure upon impact, and breakable plate means in the path of motion of said rod means and adapted to be pierced by said rod means when said rod means moves against said plate means, the breakage of said plate means by said rod means and deformation of said compartment dissipating the kinetic energy of the impact.

2. The passenger protection arrangement as defined in claim 1 wherein said rod means and said breakable plate means comprises a plurality of push rods and a plurality of breakable plate assemblies, each push rod cooperating with one breakable plate assembly, said push rods and breakable plate assemblies being arranged in series combination.

3. The passenger protection arrangement as defined in claim 1 including space means for spacing and separating said breakable plate means, said breakable plate means comprising a plurality of breakable plates.

4. The passenger protection arrangement as defined in claim 3 wherein said spacer means comprises a bent portion of said breakable plate, said bent portion being integral with the exterior rim of said plate.

* * * * *